May 7, 1968 H. S. CHURCH ET AL 3,381,362
MANUFACTURE OF PLATE METAL PARTS WITH THREADED STUD FASTENERS
Filed Nov. 4, 1965 3 Sheets-Sheet 1

INVENTORS
HERMAN S. CHURCH &
BY DON C. PRICE

*Frease, Bishop & Schick*
ATTORNEYS

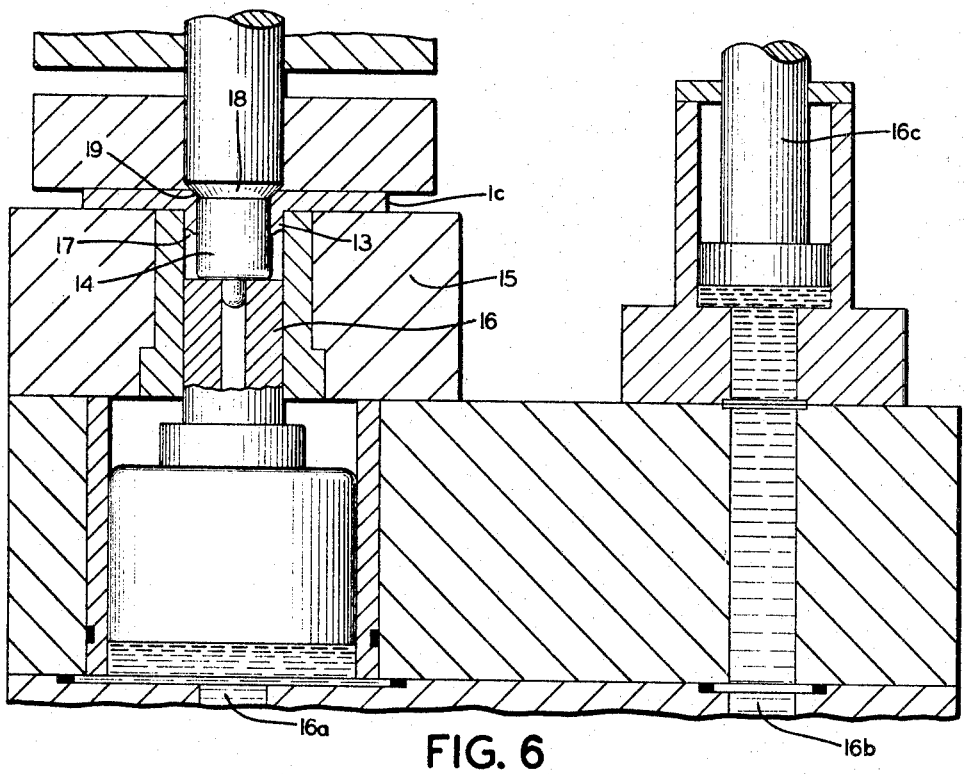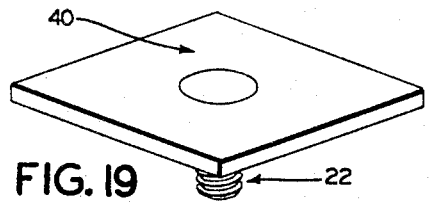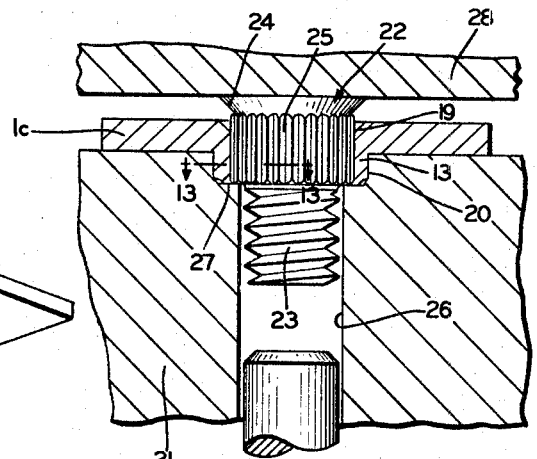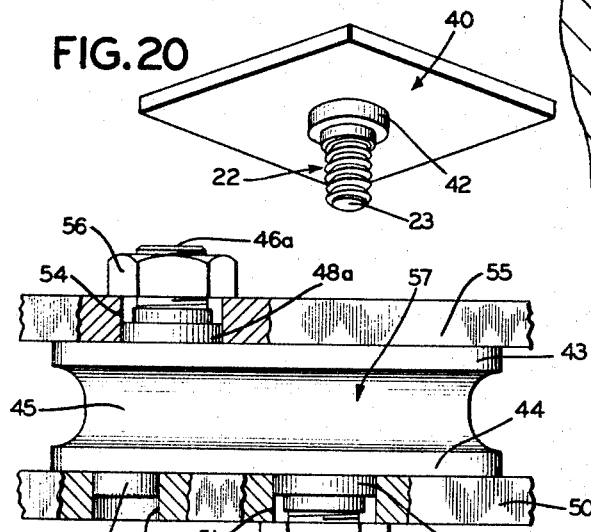

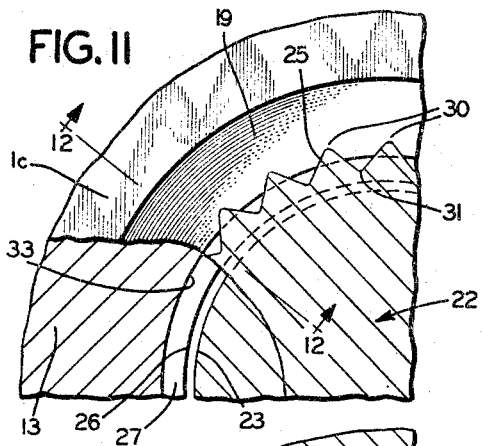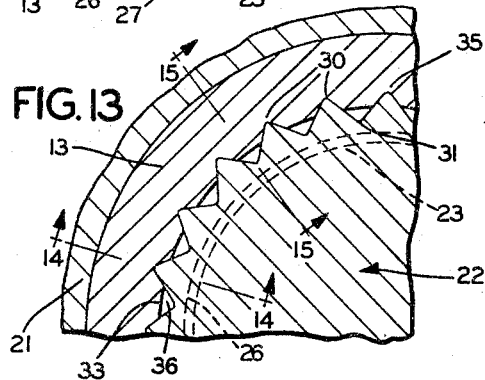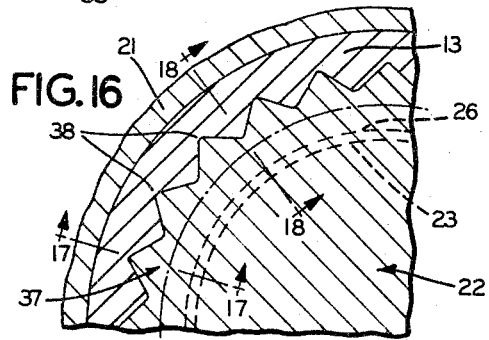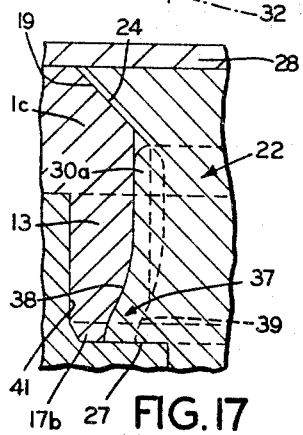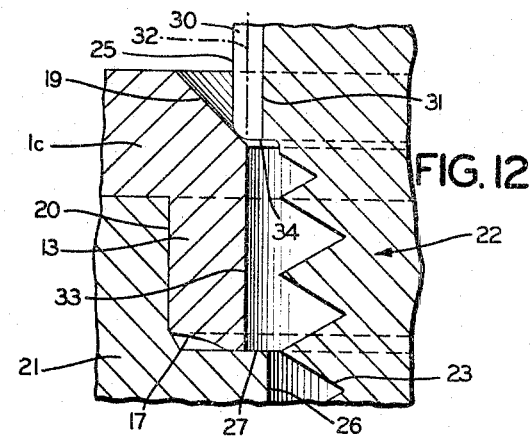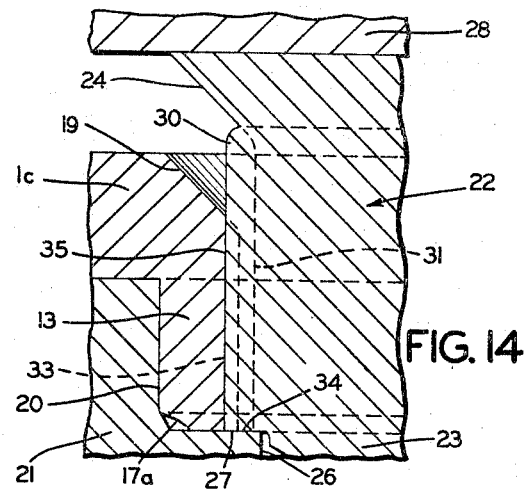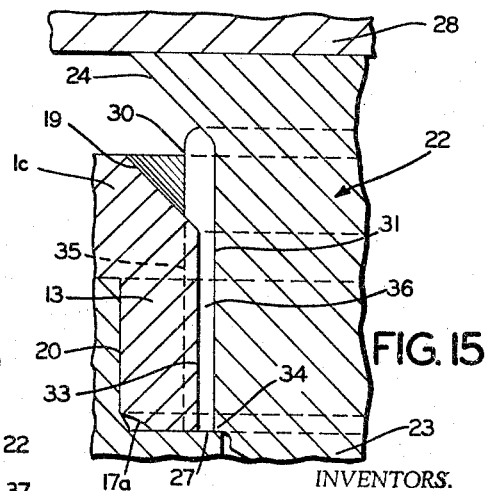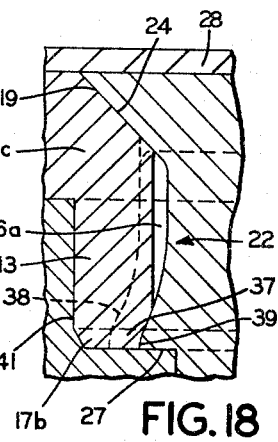

United States Patent Office 3,381,362
Patented May 7, 1968

3,381,362
MANUFACTURE OF PLATE METAL PARTS
WITH THREADED STUD FASTENERS
Herman S. Church, Cuyahoga Falls, and Don C. Price, Canton, Ohio, assignors to The Monarch Rubber Company, Hartville, Ohio, a corporation of Ohio
Filed Nov. 4, 1965, Ser. No. 506,300
11 Claims. (Cl. 29—432.2)

The invention relates to the manufacture of a plate metal product usually formed to desired shape by bending, stamping or drawing operations and having one or more threaded stud fasteners integrally connected with the plate metal and projecting from one surface only of the plate metal product.

A complex problem long has existed in the art where a plate metal part has a threaded stud rigidly and integrally connected thereto with a threaded shank of the stud projecting from one surface of the part.

Heretofore, such a projecting threaded stud has been connected with a plate metal part by forming an opening through the plate metal wall, then inserting the threaded shank of a headed stud through the opening to engage the head against the surface of the plate opposite that from which the threaded shank extends, and then welding the stud head to the plate metal to rigidly connect the stud and plate. Alternatively, an opening has been punched in a plate metal wall and then a headed threaded stud having alternate ribs and grooves formed longitudinally of the stud shank in a zone adjacent the head has been inserted into the opening and the head pressed into contact with the surface of the plate opposite that from which the threaded shank extends, to stake the stud ribs and grooves to the plate metal against rotation in the opening.

In each instance, the stud head projects from the plate metal surface opposite that from which the threaded shank extends. This has presented a serious problem where the plate metal product with an integral threaded stud becomes a component of a composite molded metal-rubber product used extensively in many fields, such for example, as a motor mount in automotive construction. In such a composite metal-rubber product, molded rubber is bonded to the stud head and to the surface of the plate metal component from which the stud head extends or projects. However, in use the projecting stud head affects rubber displacement or movement and the bond between the rubber, the stud head and the surface of the metal part. This in turn affects the dynamic rate of and stress points in the rubber resulting in abrasion and tearing of the rubber at the bond during extended continued relative movement between portions of the rubber, and the plate metal and stud head bonded thereto incident to operation of an automobile using the composite metal-rubber product.

Accordingly, it is an object of the invention to provide for the manufacture of a plate metal product having a threaded stud assembled and integrally connected with a plate metal part rigidly and permanently against relative movement between the plate metal and stud (short of complete destruction of the connection), while eliminating the projection of any stud head from the surface of the plate metal part to which rubber may be bonded, or which is opposite that surface from which the threaded shank of the stud projects.

Also, it is an object of the present invention to provide a series of interrelated cold working, extrusion, and upsetting procedures for integrally connecting a headed threaded stud fastener with a plate metal part, while eliminating stud head projection from the surface of the part opposite that from which the threaded shank of the stud projects.

Also, it is an object of the present invention to provide new method procedures for producing plate metal parts with integral threaded stud fasteners free of stud head projection from the plate metal part, which may be incorporated as a part of usual plate metal stamping procedures so that the integral threaded stud fastener construction may be manufactured at minimum cost.

Also, it is an object of the present invention to provide for the manufacture of a plate metal product having a threaded stud integrally connected rigidly with and extending from one surface of a plate metal part, and having a pilot formation also extending from said one surface concentric with the threaded stud and adapted accurately to locate the plate metal product with reference to another part when the threaded stud is bolted to such other part.

Finally, it is an object of the present invention to provide new procedures for joining a threaded stud with a plate metal part, which eliminate difficulties heretofore encountered in the art; which avoid problems, reduce costs and provide products having enhanced characteristics; which provide a product that eliminates difficulties in the manufacture of composite metal-rubber products; and which achieve the stated objects in a simple, effective and inexpensive manner, thereby satisfying needs existing in the art.

These and other objects and advantages apparent to those skilled in the art from the following description and claims may be obtained, the stated results achieved, and the described difficulties overcome, by the methods, steps, procedures, treatments, and discoveries which comprise the present invention, the nature of which is set forth in the following general statement, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the present invention may be stated in general terms as including in the manufacture of a precision formed threaded stud fastener projecting integrally from one surface only of a plate metal stamping, the steps of providing a plate metal, preferably steel, blank; piercing a hole in the blank; then shaving the annular surface of the pierced hole to eliminate the normal metal breakout resulting from piercing; then confining the blank metal from within the shaved hole and at annular areas at the top and bottom surfaces of the blank surrounding the ends of the shaved hole, then forwardly extruding the blank metal to displace the thus-confined metal under compression downwardly to form a sleeve projecting integrally from the blank having cylindrical inner and outer concentric sleeve surfaces and an open end spaced from the blank; then removing confining pressure from the open sleeve end, then coining pressure forming a tapered annular chamfer at the intersection of the top blank surface and the inner cylindrical sleeve surface to further cold work and displace metal forwardly in the sleeve during the coining step and to impart a permanent set to the cold worked sleeve metal; then inserting into the sleeve the threaded shank of a bolt having a tapered head and a zone between the tapered head and threaded shank formed circumferentially with longitudinally extending spline ribs and grooves having a spline pitch diameter preferably equal to the inner diameter of the cylindrical sleeve, and pressing the spline ribs axially downward into the sleeve metal until the tapered stud head engages the tapered annular sleeve chamfer; meanwhile as the stud head approaches the sleeve chamfer rearwardly upsetting and radially expanding the stud metal forming the spline rib and groove end portions adjacent the open end of the sleeve outwardly into the sleeve metal, thereby trapping sleeve metal between the tapered stud head and the expanded spline end portions; and while radially expanding the stud metal spline end portions cold work reforming and coining the sleeve metal at the open sleeve end.

By way of example, the improved procedure for forming plate metal parts with threaded integrally connected stud fasteners, as well as various die means used to carry out the procedure, are shown somewhat diagrammatically in the accompanying drawings forming part hereof in which:

FIG. 6 is a somewhat diagrammatic sectional view of die and control means used for the next forward extrusion step, showing the die means at the completion of downward punch movement;

FIG. 9 is a view similar to FIG. 8 showing the location of parts at an intermediate stage of stud insertion;

FIG. 11 is an enlarged fragmentary sectional view looking in the direction of the arrows 11—11, FIG. 8;

FIG. 12 is a fragmentary sectional view looking in the direction of the arrows 12—12, FIG. 11;

FIG. 13 is a view similar to FIG. 11 but looking in the direction of the arrows 13—13, FIG. 9;

FIG. 14 is a view similar to FIG. 12 looking in the direction of the arrows 14—14, FIG. 13;

FIG. 15 is a view similar to FIG. 14 but taken on the line 15—15, FIG. 13;

FIG. 16 is a view similar to FIGS. 11 and 13 taken on the line 16—16, FIG. 10;

FIG. 17 is a fragmentary sectional view looking in the direction of the arrows 17—17, FIG. 16;

FIG. 18 is a view similar to FIG. 17 looking in the direction of the arrows 18—18, FIG. 16;

FIG. 19 is a perspective view of a plate metal product having an integrally connected stud fastener projecting from one surface only of the product looking toward the plate metal surface opposite that from which the threaded stud projects;

FIG. 20 is a prespective view similar to FIG. 19 but looking toward the plate metal surface from which the threaded stud projects and illustrating the pilot portion concentrically located with respect to the stud; and FIG. 21 is a view of a composite metal-rubber product incorporating the improved integral threaded stud construction piloted and bolted to a structural member.

Similar numerals refer to similar parts throughout the various figures of the drawings.

The improved method is illustrated diagrammatically in FIGS. 1, 3, 5, 7, 8, 10, and 19 which show a plate metal blank in various stages of the procedure used to integrally and permanently connect a threaded stud with a plate metal blank so as to project from one surface only of the plate metal product. Steps in the method also are illustrated somewhat more in detail by the dies used in various steps of the procedure as shown in FIGS. 2, 4, 6, 8, 9, and 10. The manner in which the metal is displaced and flows during the stud insertion step is illustrated somewhat diagrammatically in FIGS. 11 through 18. The completed metal product is shown in FIGS. 19 and 20, while a typical composite metal-rubber product is illustrated in FIG. 21.

Figure 2:
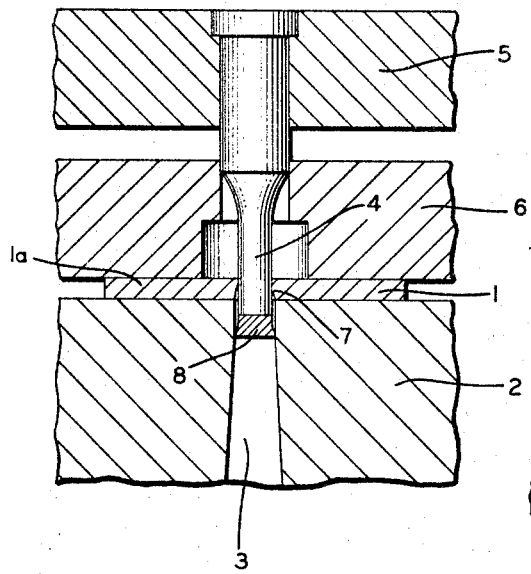
FIG. 2 is a somewhat diagrammatic sectional view illustrating the first or piercing method step.
Figure 3:
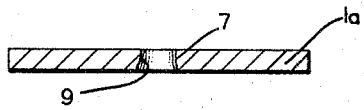
FIG. 3 is a diagrammatic sectional view of a pierced blank resulting from the piercing operation of FIG. 2.
Figure 4:
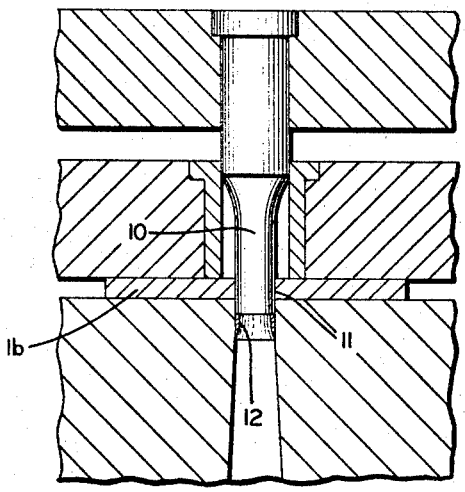
FIG. 4 is a view similar to FIG. 2 showing the next shaving step.

While the drawings indicate the connection of only one threaded stud to one flat plate metal blank, more than one stud may be connected by duplicating the dies and other tools used at each stage of the procedure. Also the blank is not necessarily merely a flat blank at all stages but may have flanges, etc. formed therein at certain stages to form the desired shape of metal stamping. Further, although separate dies are illustrated in FIGS. 2, 4, and 6, the operations there shown, if desired, may be incorporated in progressive stamping die means used to stamp and form a stamped plate metal component in which one or more tubular sleeves are cold extruded for receiving threaded studs to be connected thereto.

Finally, the particular metal or alloy and its composition, such as one type of steel which may be used for the plate metal component, is not necessarily the same as the type or analysis of metal or alloy from which the threaded stud component is formed.

Figure 1:
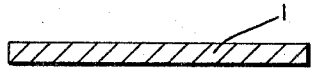
FIGURE 1 is a sectional view of a sheet or plate metal blank to which a threaded stud fastener is to be connected.

The plate metal blank 1 in FIG. 1 has the required size and thickness to form the desired finished stamped plate metal component from which a threaded stud fastener is to project integrally from one surface only of the blank. The first step is a usual piercing step which may be carried out in the die means illustrated in FIG. 2 which includes a die shoe 2 having a piercing opening 3 formed therein, a punch 4 carried by punch holder 5, and a spring-pressed stripper plate 6 carried by punchholder 5. Die shoe 2 may be mounted in the usual manner on a punch press bed and punch holder 5 is carried by the punch press ram or movable head.

The piercing die means parts are illustrated in their relative positions at the completion of the piercing operation in which the punch 4 has pierced blank 1 at 7 forming a pierced slug 8 and a pierced blank 1a.

Pierced opening 7 may have a diameter in general approximating the thickness of the metal pierced, that is, the thickness of blank 1; or the diameter may be greater, depending upon the desired length of sleeve subsequently to be formed. The bigger the opening, the shorter is the sleeve that may be formed. Metal breakout at the bottom of pierced hole 7 occurs when plate metal is pierced, normally extending through about 60% of the plate metal thickness, the breakout being diagrammatically indicated at 9 in FIG. 3.

This metal breakout 9 in pierced hole 7 must be obliterated or removed and a hole having a uniform diameter throughout must be established in order to extrude a sleeve integrally from the blank 1a for receiving and connecting a desired threaded stud fastener.

Figure 5:
FIG. 5 is a diagrammatic view similar to FIG. 3 illustrating the shaved blank produced by the shaving operation of FIG. 4.

Breakout 9 is removed in the die means illustrated in FIG. 4 to produce blank 1b shown in FIG. 5. The operation is carried out using a typical punch 10 (FIG. 4). Punch 10 shaves breakout surface 9 from pierced hole 7 to form a truly cylindrical shaved hole 11 in shaved blank 1b. The metal containing the nonuniform breakout surface 9 shaved from blank 1a to form blank 1b is indicated at 12 in FIG. 4.

The next step of cold extruding a sleeve preferably is performed in die means generally and diagrammatically shown in FIG. 6. This cold extrusion step may be carried out as described and illustrated in detail in the copending application of Don C. Price Ser. No. 411,753 filed Nov. 17, 1964. The cold extrusion step of FIG. 6 provides blank 1b with an integral extruded sleeve 13 producing blank 1c shown in FIG. 7. Cold extrusion punch 14 and die 15 cooperate during the downward stroke of the punch to confine the blank metal from within the shaved hole 11 and at annular areas at the top and bottom surfaces of the blank 1b surrounding the ends of the shaved hole 11. During such downward punch movement, blank metal is forwardly extruded to displace confined metal under compression downwardly to form sleeve 13 with concentric cylindrical inner and outer surfaces.

After punch portion 14 passes completely through extruded sleeve 13, confining pressure of movable die cavity member 16 is removed by further downward movement of the punch so that the open end 17 of sleeve 13 is unconfined. As punch 14 moves to its final position shown in FIG. 6, the tapered shoulder 18 of the punch by coining pressure forms a tapered annular chamfer 19 at the intersection of the top surface of blank 1c and the inner cylindrical sleeve surface. This coining pressure further cold works and displaces metal forwardly or downwardly in sleeve 13 to impart a permanent set to the cold worked sleeve metal.

Confining pressure during the initial stages of forward cold extrusion (FIG. 6) is maintained by hydraulic pressure on movable die member 16, indicated at 16a, which preferably is connected with control means 16b actuated by piston 16c also operated by the ram which moves punch 14. This control permits member 16 to back away from the blank 1c being cold worked as punch 14 completes its downward movement, in a manner described in detail in said application Ser. No. 411,753.

Figure 8:
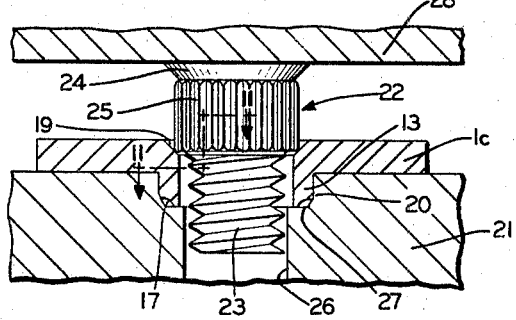
FIG. 8 is an enlarged somewhat diagrammatic sectional view illustrating the next step of inserting a specially formed headed threaded stud into the extruded blank of FIG. 7; and showing the parts at the beginning of stud insertion.

The thick walled sleeve 13 of blank 1c is now ready to receive the threaded stud to be integrally connected therewith. The stud insertion step is illustrated generally in FIGS. 8, 9, and 10. Blank 1c is placed in die cavity 20 provided in die member 21 as illustrated in FIG. 8. A specially formed threaded stud generally indicated at 22 then is inserted with its threaded shank 23 passed into and partially through sleeve 13. Stud 22 has a tapered head 24 and a spline formation 25 connecting head 24 and threaded shank portion 23. The central opening 26 in die 21 extending below die cavity 20 has a smaller diameter than the inner diameter of sleeve 13, thereby presenting a shoulder 27 extending inwardly below the open end 17 of sleeve 13.

When blank 1c has been positioned as described in the stud insertion die means of FIG. 8, ram 28 moves downward pushing the tapered head 24 of stud 22 and forcing the spline formation 25 into sleeve 13 until the lower end of spline formation 25 reaches shoulder 27 as shown in FIG. 9.

At this point of downward movement of ram 28, further downward movement of metal in the lower end of spline formation 25 is prevented by die shoulder 27.

Figure 10:
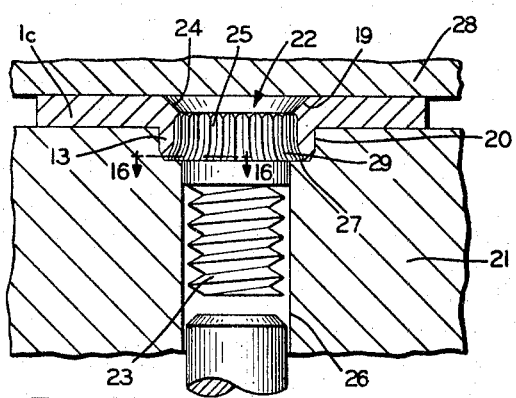
FIG. 10 is a view similar to FIGS. 8 and 9 illustrating the stud completely inserted and integrally permanently connected with and projecting from one surface only of a plate metal product.

As the ram 28 continues to move downward from the position of FIG. 9 to the position of FIG. 10, die shoulder 27 rearwardly upsets and radially expands metal in stud 22 at the end portion of spline formation 25 adjacent the open end 17 of sleeve 13 as indicated generally at 29 in FIG. 10. Upon completion of downward movement of ram 28, tapered stud head 24 seats against chamfer 19 formed in blank 1c. Thus, metal in the sleeve of blank 1c is trapped between the tapered stud head 24 and the expanded spline end portion 29.

The manner in which spline formation 25 of stud 22 enters sleeve 13 and is cold worked and reformed with respect to sleeve 13 is best shown in FIGS. 11 through 18. The relative positions of the stud 22 and extruded blank 1c at the start of the stud insertion operation of FIG. 8 are shown on an enlarged scale in FIGS. 11 and 12. Spline formation 25 is formed of alternate ribs 30 and grooves 31 having an intermediate pitch diameter represented by the dot-dash line 32 in FIGS. 12 and 16. This pitch diameter preferably should be equal to the inner diameter of sleeve 13 indicated by the inner sleeve surface 33. Thus, at the beginning of the stud insertion step, the lower ends 34 of the ribs 30 of spline formation 25 rest on the tapered annular chamfer 19 of blank 1c as best shown in FIG. 12.

As ram 28 moves downward from the position of FIG. 8 to the position of FIG. 9, rib portions 30 of spline formation 25 are forced into the metal adjacent the inner surface 33 of sleeve portion 13 forming complementary grooves 35 in sleeve 13 (FIGS. 13, 14, and 15). Voids 36 extend between the grooves 31 of stud 22 and the inner sleeve surface 33 as shown in FIGS. 13, 14, and 15. This reforming of metal in sleeve 13 during stud insertion continues until the lower ends 34 of spline ribs 30 reach die shoulder 27 as shown in FIGS. 14 and 15. Meanwhile, the metal shape at lower open end 17 of sleeve 13 which has a somewhat chamfered shape as shown in FIG. 12 resulting from the forward extrusion operation, is reshaped somewhat as indicated at 17a in FIG. 14 starting to more completely fill out die cavity 20 due to the entry of the spline ribs 30 into the sleeve metal.

Further downward movement of ram 28 from the position of FIG. 9 to the position of FIG. 10 when stud head 24 seats in sleeve chamfer 19 is shown in FIGS. 16, 17, and 18. This movement rearwardly upsets, expands and reforms the metal in the lower end of spline formation 25 due to the resistance of die shoulder 27. Thus, metal in the lower ends of the spline ribs 30 in the region indicated at 34 in FIGS. 14 and 15 is pushed upward or rearward as shown in FIGS. 17 and 18 in respect to the insertion movement of stud 22, and this stud metal 34 is also expanded generally radially of stud 22 to reform the stud metal as indicated generally at 37 in FIGS. 16, 17, and 18. The lower ends of spline ribs 30 are moved laterally or radially outward, further reforming the metal in the sleeve near the open sleeve end 17a (FIG. 14) as indicated at 17b in FIGS. 17 and 18. The upsetting and outward expansion of the lower ends of the spline ribs, at 37, pushes the spline ribs completely into the sleeve metal as indicated at 38 in FIGS. 16 and 17. At the same time, the lower ends of the grooves 31 are expanded outward as shown in FIGS. 17 and 18 so as to be completely filled with sleeve metal as indicated at 39.

However, care is exercised in determining the amount of metal in the sleeve 13 and stud 22 which can be contained in die cavity 20 such that sleeve metal does not move upward or radially inwardly of stud 22 (FIG. 18) to flow into void portion 36a remaining between expanded groove end portion 39 and stud head 24. Metal flow from the sleeve into or filling void 36a will be accompanied by loosening of the adjacent metal contact between rib portions 30a and sleeve metal at the upper ends of the ribs above the upset portion 37 thereof.

Meanwhile, during the upsetting and expanding of metal in the lower end of the spline ribs, the metal in the lower end of sleeve 13 completely fills out die cavity 20 to eliminate voids, as is indicated at 17b in FIGS. 17 and 18.

The reformed spline portions 37 and 39 trap metal in sleeve 13 between the reformed portions 37 and 39 and the head 24 of threaded stud 22 to prevent stud 22 from being withdrawn from the sleeve short of destruction of the parts. At the same time the interengagement between the spline rib portions 30a and the sleeve metal prevent rotation of the stud 22 with respect to the sleeve 13. In this manner the threaded stud 22 is permanently and integrally connected within the sleeve 13 of metal blank 1c projecting from one side only of the integrated product indicated at 40 in FIGS. 19 and 20.

During the stud insertion step, concentricity is maintained between stud 22 and the outer surface 41 of sleeve 13 by the die cavity 20; and sleeve 13 is sized accurately as to length. This produces a concentric annular boss 42 surrounding the upper end of the threaded portion 23 of the stud 22 at the surface of plate metal product 40 from which the stud projects.

Referring to FIG. 21, several plate metal parts 43 and 44 may be molded and bonded together by rubber 45 in spaced relation with flat sides opposed and bonded to the intervening rubber, and with one or more studs 46 and 46a projecting from one side only of each of members 43 and 44. A dimple 47 if desired may be formed in member 44. Each of studs 46 is surrounded by an annular boss 48 concentric therewith as described. The composite metal-rubber product 57 of FIG. 21 may be installed as a motor mount in automotive assembly. Plate member 44 will rest on a frame member 50 with boss 48 piloted in an opening 51 at predetermined position and stud 46 clamped to member 50 with nut 52. Dimple 47 also may be engaged in a second opening 53 in frame 50 to prevent rotating movement of member 44 with respect to frame member 50.

An opening 54 at predetermined location in a base portion 55 of an automobile motor is then received over pilot portion 48a of plate metal member 43 and stud 46a is bolted to member 55 by nut 56.

Heretofore, composite metal-rubber products such as motor mount 57 equipped with a threaded stud in prior devices extending from one surface of one of the metal parts had a stud head projecting from the other surface of the part into the rubber bonded thereto. This head projecting into the rubber 45 is eliminated in the improved product 57 illustrated, thus giving the composite product uniform rubber characteristics throughout for the rubber 45 intervening and bonded to members 43 and 44. The elimination of the stud heads projecting from the metal members into the rubber in the composite metal-rubber part 57 very substantially increases the life of the part in withstanding torque, shock and dead weight loading to which the product is subjected in use when an automobile is operated.

The open end of the extruded blank 1c has a somewhat chamfered formation 17 resulting from displacement of metal in forwardly extruding the sleeve 13 in the final coining stage of the extruding operation, as shown in FIGS. 6, 7, 8 and 12. This chamfered formation 17, as described permits further displacement of metal at the open end of the sleeve, first to permit reforming metal in the sleeve during the stud insertion step as shown at 17a in FIGS. 14 and 15, and later to permit complete die fillout as indicated at 17b in FIGS. 17 and 18 at the completion of the spline upsetting, expanding, coining, and sizing stage of the stud insertion step.

Figure 7:
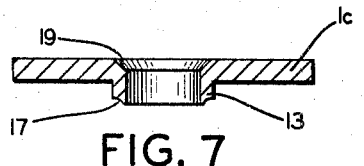
FIG. 7 is a view similar to FIGS. 3 and 5 illustrating the extruded blank resulting from the extruding operation of FIG. 6.

The length of the extruded sleeve 13 in successive blanks cold extruded in die means such as illustrated in FIG. 6 may not be absolutely uniform or exactly the same. However, this makes no difference in the final product 40 since sleeve 13 is sized accurately to length during the stud insertion step and slight variations from blank to blank in the length of the extruded sleeve 13 of FIG. 7 are accommodated by slight variations in the length of the void 36a (FIG. 18) produced at the completion of the stud insertion step.

Accordingly, the present invention in addition to providing new products having the many new properties and characteristics described also provides a new procedure for the manufacture of a plate metal part with an integral threaded stud fastener from heavy gauge metal with the stud projecting from one surface only of the plate metal part and with the projecting stud surrounded at the surface of the plate metal part from which it projects with a concentric boss which may be used as a pilot in the installation and use of the end product.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and of the new procedures and products are by way of example and the scope of the invention is not limited to the exact details shown or described because various fundamental procedures of the invention without departing from the fundamental principles set forth.

Although the terms "sheet metal" and "plate metal" are used herein, when referring to various gauges of material, since the invention is applicable to the manufacture of products from either sheet or plate metal, it is understood that the terms are used more or less synonymously.

Having now described the features, discoveries and principles of the invention, the manner in which the new procedures are carried out, the characteristics of the new products produced, and the advantagous, new and useful results obtained thereby; the new and useful methods, steps, procedures, discoveries and principles, and mechanical equivalents obvious to those skilled in the art are set forth in the appended claims.

Certain product structures produced by the new procedures which are described but not claimed herein are claimed in our copending application S.N. 507,414, filed Nov. 12, 1965, now Patent No. 3,367,685.

We claim:

1. In a method of making a plate metal product having a threaded stud projecting integrally from one surface only of the product, the steps of providing a plate metal blank having two surfaces, extruding from blank metal a tubular sleeve having inner and outer concentric surfaces and an open end projecting from one blank surface, forming recess means at the intersection of the inner sleeve surface and the other blank surface; providing a threaded metal stud having a threaded shank, a head complementary in shape to the shape of said recess means, and spline formation means having a portion of greater diameter than the diameter of the inner sleeve surface extending axially of the stud a distance greater than the length of the sleeve and connecting the head and shank; telescoping the stud into the sleeve and axially driving the spline means into sleeve metal, thereby reforming sleeve metal by and to interfit with said greater diameter spline portion; continuing axial driving until the stud head seats in said recess means; and upsetting and expanding spline means metal into the sleeve metal at the open end of the sleeve as the stud head seats in said recess means.

2. The method defined in claim 1 in which the sleeve is extruded from blank metal by forming a uniform diameter hole through the metal blank, and then forwardly cold extruding blank metal surrounding the hole to form the tubular sleeve.

3. The method defined in claim 1 in which the recess means is formed with an annular, tapered, countersunk shape.

4. The method defined in claim 1 in which the metal stud head has a top surface, and in which the stud is driven into the sleeve until the stud top surface is flush with said other blank surface.

5. The method defined in claim 1 in which the spline formation means extending axially of the stud and connecting the stud head and shank is provided by alternate rib and groove formations, and in which the rib and groove spline formation means is provided with a pitch diameter equal to the diameter of the inner sleeve surface.

6. The method defined in claim 5 in which groove portions of the spline formation means are located with respect to the inner sleeve surface to form voids between stud and sleeve metal after the stud has been driven into the sleeve.

7. The method defined in claim 1 in which the spline formation means is provided by alternate rib and groove formations, and in which rib and groove portions of the spline means adjacent the open end of the sleeve are expanded into and displace sleeve metal at the open end of the sleeve.

8. The method defined in claim 1 in which the sleeve metal at the open end of the sleeve is displaced and coined at the same time that the spline means metal is upset and expanded into the sleeve metal.

9. The method defined in claim 8 in which the sleeve is sized as to length at the same time that metal in the open end of the sleeve is displaced and coined.

10. The method defined in claim 1 in which the metal stud head has a top surface, in which the stud is driven into the sleeve until the stud top surface is flush with said other blank surface, and in which rubber is molded with and bonded to said other blank surface and stud head top surface flush therewith to provide a composite metal-rubber product having uniform rubber displacement characteristics.

11. In a method of making a plate metal product having an integral stud member with a threaded shank projecting from one surface of the product, the steps of providing a plate metal blank having two surfaces, extruding from blank metal a tubular sleeve having inner and outer concentric surfaces and an open end projecting from one blank surface, forming recess means at the intersection of the inner sleeve surface and the other blank surface; providing a metal stud member having a threaded shank portion, a head having a portion complementary in contour to the contour of said recess means, and spline formation means having a portion of greater diameter than the diameter of the inner sleeve surface extending axially of the stud member a distance greater than the length of the sleeve and connecting the head and shank portions; telescoping portions of the stud member into the sleeve and axially driving the spline means into sleeve metal, thereby reforming sleeve metal by and to interfit with said greater diameter spline portion; continuing axial driving until the complementary stud head portion and recess means contours are in seated relation; upsetting and expanding spline means metal into the sleeve metal at the open end of the sleeve; and trapping sleeve metal axially between the stud head portion and expanded spline means metal.

References Cited

UNITED STATES PATENTS

| 1,302,699 | 5/1919 | Noble et al. | 29—509 |
| 2,127,969 | 8/1938 | Dingwerth | 29—509 X |
| 2,276,050 | 3/1942 | Leighton | 29—509 |
| 2,347,219 | 4/1944 | Schnell | 151—41.724 X |
| 3,093,887 | 6/1963 | Prestige et al. | 29—432 X |
| 3,014,609 | 12/1961 | Hobbs | 29—509 |

FOREIGN PATENTS

| 938,490 | 10/1963 | Great Britain. |
| 74,522 | 2/1947 | Norway. |

CHARLIE T. MOON, *Primary Examiner.*